United States Patent [19]
Petersen

[11] Patent Number: 5,996,968
[45] Date of Patent: Dec. 7, 1999

[54] VALVE DRIVER ELEMENT INCLUDING A HIGH TEMPERATURE THERMOPLAST FOR REDUCING FRICTION

[75] Inventor: Hans Kurt Petersen, Nordborg, Denmark

[73] Assignee: Danfoss A/S, Nordborg, Denmark

[21] Appl. No.: 08/737,773

[22] PCT Filed: May 18, 1995

[86] PCT No.: PCT/DK95/00196

§ 371 Date: Nov. 12, 1996

§ 102(e) Date: Nov. 12, 1996

[87] PCT Pub. No.: WO95/33154

PCT Pub. Date: Dec. 7, 1995

[30] Foreign Application Priority Data

May 28, 1994 [DE] Germany ............................ 44 18 730

[51] Int. Cl.[6] .................................................. F16K 31/00
[52] U.S. Cl. ................ 251/368; 251/129.15; 137/625.23
[58] Field of Search .............................. 251/368, 129.15, 251/129.21; 335/262; 137/625.21, 625.23

[56] References Cited

U.S. PATENT DOCUMENTS

| | | | |
|---|---|---|---|
| 4,233,585 | 11/1980 | Sugimoto et al. | 335/262 |
| 4,635,681 | 1/1987 | Boldish | 137/625.5 |
| 4,838,145 | 6/1989 | Slocum et al. | 91/536 |
| 5,145,148 | 9/1992 | Laurent | 251/129.14 |
| 5,464,191 | 11/1995 | Shenk | 251/129.21 |
| 5,518,027 | 5/1996 | Saiki et al. | 137/550 |

Primary Examiner—A. Michael Chambers
Attorney, Agent, or Firm—Lee, Mann, Smith, McWilliams, Sweeney & Ohlson

[57] ABSTRACT

A valve is disclosed having a closure member which co-operates with a valve seat and is movable by an actuating device with a driver element, which driver element is guided in a housing. It is desirable for such a valve to operate reliably and have a long service life. For that purpose, a high-temperature thermoplast is arranged between the housing and the driver element.

14 Claims, 2 Drawing Sheets

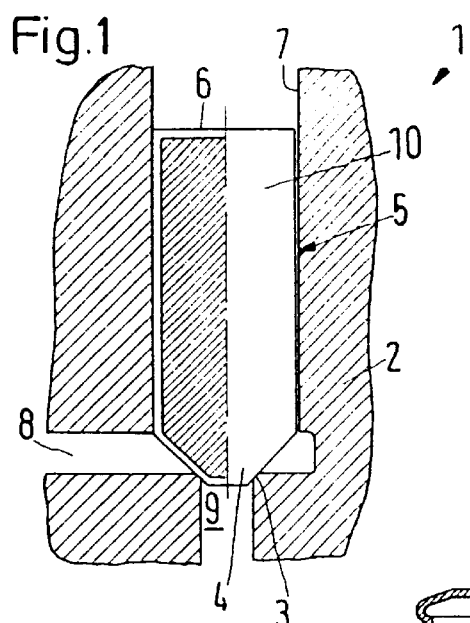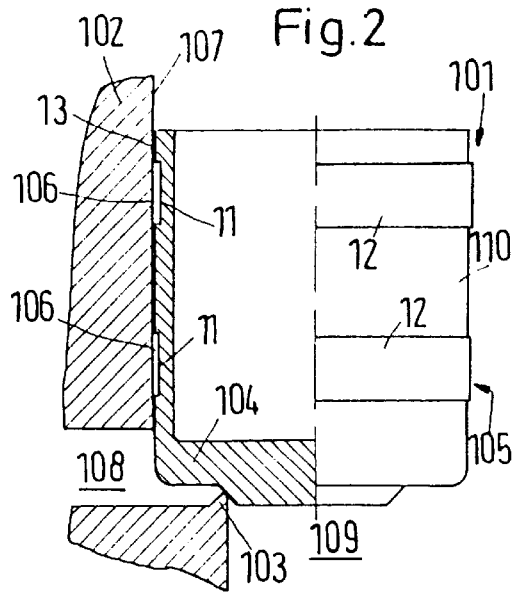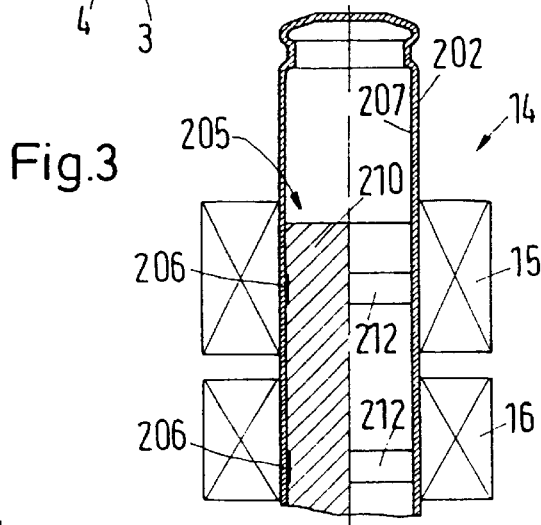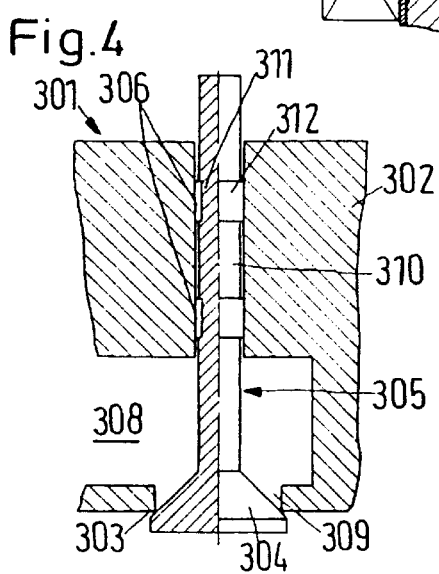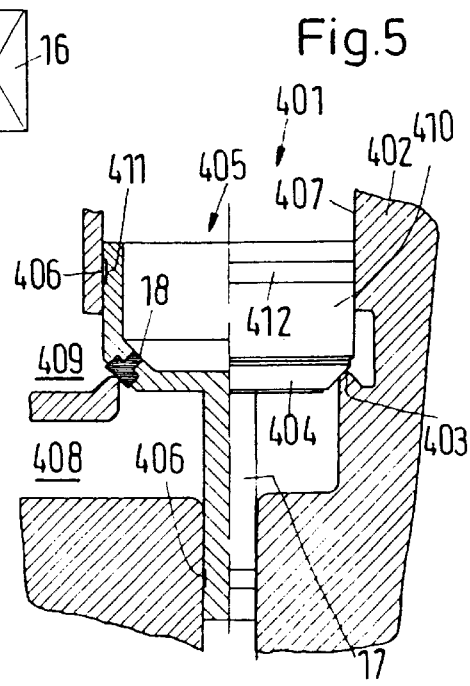

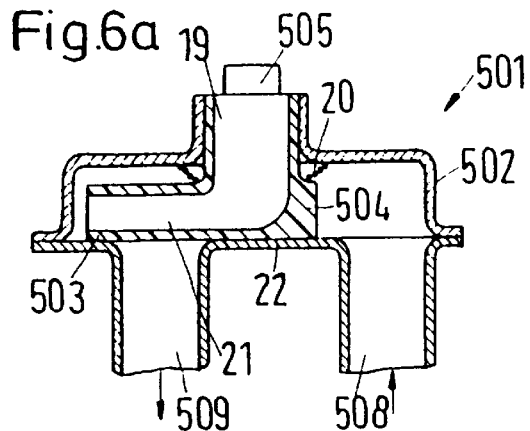
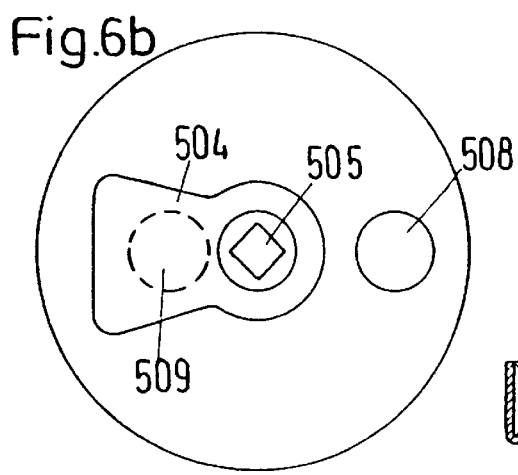
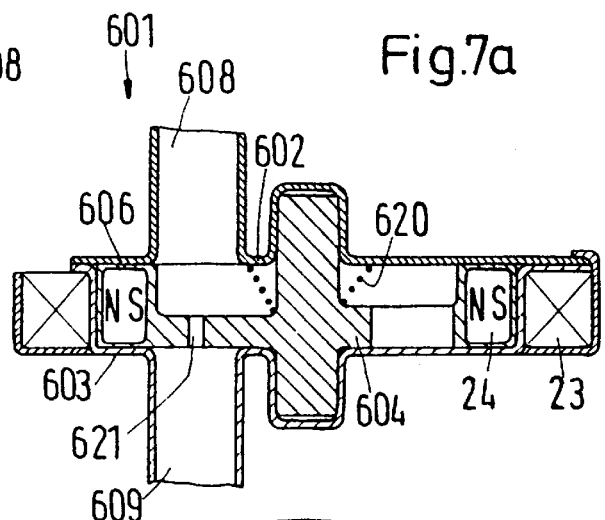
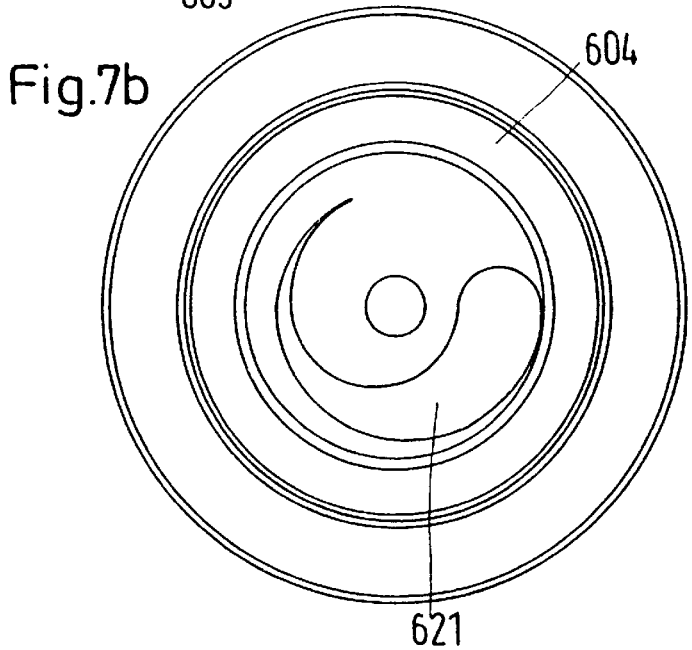

VALVE DRIVER ELEMENT INCLUDING A HIGH TEMPERATURE THERMOPLAST FOR REDUCING FRICTION

BACKGROUND OF THE INVENTION

The invention relates to a valve having a closure member which co-operates with a valve seat and is movable by an actuating device with a driver element, which driver element is guided in a housing.

U.S. Pat. No. 5,145,148 discloses such a valve, which is used in a brake system to control the flow, or the pressure, of the brake fluid. There, the driver element is in the form of a rod which, on actuation by an armature, which changes its position when current flows through a coil surrounding it, pushes a ball away from a valve seat. The rod is in this particular case surrounded by a nylon bushing which guides the rod in the housing. The rod is relatively thin in order not to disrupt the magnetic circuit. The nylon bushing is correspondingly thick.

In such a construction, malfunctioning of the valve can occasionally be observed, that is, the valve does not open or does not close when desired, but remains in the position it has assumed. This is attributed to the different thermal expansion coefficients of driver element and housing on the one hand and of the nylon bushing on the other hand. If the nylon bushing expands to a relatively great extent, the driver element becomes jammed in the housing. This effect can be partly eliminated by providing a larger clearance between the nylon bushing and the housing, but this clearance leads to imprecise guiding. This measure is also not suitable if it is wished to guide the driver element in the housing with an improved seal, nor if a defined gap between the driver element and the housing is an important factor, the gap being intended to damp the movements of the driver element.

Such a gap also causes accelerated wear of the valve, because as the driver element moves, not only is there purely frictional loading on adjacent surfaces, but as the driver element vibrates in the housing there is also a possibility that impact loading will occur, to the detriment of the plastics material.

SUMMARY OF THE INVENTION

The invention is based on the problem of providing a reliably working valve having a long service life which is able to work with a plurality of fluids.

This problem is solved in a valve of the kind mentioned in the introduction in that between the housing and the driver element there is arranged a high-temperature thermoplast.

The high-temperature thermoplast reduces the friction between the driver element and the housing. Both parts can therefore slide in low-friction engagement on one another. The high-temperature thermoplast moreover has a thermal coefficient which, although it does not correspond exactly to that of the material normally used for the driver element and the housing, normally metal, approximates to this thermal expansion coefficient very closely as regards magnitude. The thermal expansion coefficient of such a high-temperature thermoplast is normally only about double that of metal. Even when expansion does therefore occur when the temperature rises, this is not as critical as when using nylon. Thermoplast, housing and driver element can therefore be matched to one another with negligible tolerances. Moreover, the higher friction force occurring during an expansion, caused chiefly by a higher surface pressure between driver element and housing, is compensated for by the improved frictional behaviour of the high-temperature thermoplast. The lower friction therefore results not only in reduced wear, and thus in longer service life, but also in a more reliable operation of the valve. The fluids can be chemical compounds or simply water on its own.

Polyarylether ketone, especially polyetherether ketone, is preferably used as the high-temperature thermoplast. As a result, a good stability can be achieved even at relatively high temperatures. The said high-temperature thermoplasts at the same time have a comparatively good chemical resistance to a series of chemical compounds, for example, refrigerants. moreover, these thermoplastics are dimensionally very stable.

The high-temperature thermoplast is preferably fibre-reinforced. By that means, a greater mechanical strength, a better thermal conductivity and a thermal expansion approaching that of metals can be achieved.

In a preferred embodiment, the high-temperature thermoplast can have friction-reducing additives. Such additives can be constituted, for example, by carbon or polytetrafluoroethylene. They further reduce the friction between the driver element and the housing, thus not only improving operational behaviour but also achieving a lower energy consumption.

The high-temperature thermoplast is preferably in the form of a friction-reducing layer on the driver element and/or the housing. Because the high-temperature thermoplast is provided only as a layer on the respective surfaces, the thermal expansion coefficient, which may possibly be different, is no longer important. Thermal expansion is then determined predominantly by the parts carrying the layer, and not by the layer itself. Furthermore, when using a layer, the consumption of material for the high-temperature thermoplast is kept low. Finally, the previously known valves can continue to be used virtually unchanged, since application of a layer is associated with only minor structural alterations.

The layer preferably has a thickness in the region of $\frac{1}{10}$ mm. If desired, it can be even thinner. The high-temperature thermoplast must merely be present in a thickness that is sufficient to safeguard the frictional mounting of the driver element in the housing. In many cases, it is sufficient for the high-temperature thermoplast to be applied in the manner of a film.

The driver element advantageously has a core around which the high-temperature thermoplast is moulded. Moulding is a relatively simple way of applying the high-temperature thermoplast. The core is here introduced into a mould, and all cavities between the core and the mould are filled with the high-temperature thermoplast. At the same time reliable fixing of the thermoplast to the core can be achieved.

The core preferably has a rough surface. By that means the adherence of the high-temperature thermoplast to the core is improved. In many cases, machining of the surface of the core is not required at all. The rougher is the surface, the better is the thermoplastic material able to cling to it. Basically, the core can be in the form of a unworked casting of a metal.

Finishing of the driver element can then be confined to the surface of the high-temperature thermoplast. This is generally easier to carry out than machining the core per se.

The high-temperature thermoplast is preferably in the form of an injection-moulded part which is injected onto the core. By this means, a high reliability in fixing the thermoplast to the core is achieved. Moreover, shaping of the driver member can be determined in advance with great reliability. Additional machining of the driver element is in many cases not necessary at all.

The core preferably has recesses which are filled by the high-temperature thermoplast. This too further improves fixing of the plastics to the core.

It is also preferred for the driver element to be formed in one piece with the closure member. In this manner, relative movement between the driver element and the closure member can be avoided. Wear cannot take place there, and the service life can thus be further lengthened.

It is also preferred for the driver element to be surrounded completely, optionally together with the closure member, by the high-temperature thermoplast. Complete enclosure ensures that all possible surfaces at which friction could occur are provided with the friction-reducing layer. Moreover, the driver element is enclosed by the high-temperature thermoplast and is thus protected against attack by the fluid controlled by the valve.

In another embodiment, the high-temperature thermoplast is preferably arranged only in partial areas on the surface of driver element and/or housing. Material consumption is in this manner kept low, which can possibly have a beneficial effect on the production costs of the valve. Moreover, restricting the high-temperature thermoplast to partial areas means that only small changes have to be made in the structure of the valve, so that in particular in the case of electrically or magnetically-operated valves, virtually no changes in response behaviour can be observed.

The high-temperature thermoplast it preferably also arranged on the closure member in a region co-operating with the valve seat. It has been shown that the high-temperature thermoplast not only has positive effects on the frictional behaviour of the drive member, it can also be used to improve the seal of the valve. Here too, the thermal expansion coefficient of the high-temperature thermoplast, which differs only slightly from that of the material of the housing and of the driver element, has a positive effect.

The high-temperature thermoplast is preferably arranged in circumferential grooves on the driver element, and protrudes only a little beyond the circumference of the driver element. The grooves serve here to hold the thermoplast mechanically on the driver element so that when the driver element moves relative to the housing it is virtually impossible for the thermoplast to be displaced. The rings in which the high-temperature thermoplast lies proud thus lie fixedly on the driver element. Of course, the rings can also be fixed in the housing. Because they protrude only a little beyond the circumference of the driver element, that is, only a few tenths of a millimeter or even less than $1/10$ mm, direct contact between the driver element and the housing is avoided. On the contrary, contact is effected exclusively by way of the high-temperature thermoplast. On the other hand, the mechanical strength of the driver element is hardly adversely affected at all. The driver element continues to fill the housing virtually completely. Beyond the thermoplast, there is only a small air gap.

This is especially advantageous if the driver element is in the form of an armature of an electromagnetic valve. In such an electromagnetic valve, larger air gaps impair the electrical and magnetic properties. By just a thin layer or a slight projection of the high-temperature thermoplast, the air gaps which are formed and have to be bridged by the magnetic flux are therefore also only small. Notwithstanding a low-friction behaviour, no additional electrical or magnetic energies are required.

It is especially preferred for the armature to be formed from a material of good magnetic conductivity, in particular soft iron, which is covered by the high-temperature thermoplast also in all areas that can come into contact with a fluid flowing through the valve. covering with the high-temperature thermoplast now enables the material of the armature to be selected exclusively from the point of view of magnetic and electric properties. Resistance to the fluid which flows through the valve is not required. On the contrary, this resistivity is achieved by the high-temperature thermoplast, which protects the material of the armature.

The driver element is preferably guided in the direction of movement on both sides of the valve seat. This enables an improved accuracy of guidance to be achieved, in particular when the closure member is engaged with the valve seat.

The closure member is preferably in the form of a slide valve, in particular, a rotary slide valve, a least one sliding surface of the closure member being provided with the high-temperature thermoplast. In the case of a slide valve, the closure member is pushed over the valve seat. If desired, the slide valve can also have an opening of which the size changes in the direction of movement of the slide valve. Depending on the position of the slide valve, together with the inlet or outlet opening surrounded by the valve seat a smaller or larger through-opening is unblocked. In the case of a slide valve, there are normally relatively large sliding surfaces with which the slide valve can be guided in the housing. If the friction-reducing high-temperature thermoplast is now arranged on these sliding surfaces, the slide valve can be moved relatively easily. The housing can lie with greater forces against the slide valve. The valve can thus have a better seal without the actuating forces having to be appreciably increased.

It is especially preferred for the slide valve to be the rotor of an electromagnetic stepping motor, in which also the electromagnetic components are enclosed by high-temperature thermoplast. The electromagnetic components, for example, permanent magnets, can now be selected exclusively from the point of view of their magnetic or electrical properties, that is to say, the components need not be resistant to the fluids to be controlled. On the contrary, these are kept away from the components by the high-temperature thermoplast. It is therefore possible to use permanent magnets that are normally very susceptible to corrosive fluids in such a valve.

It is also preferred for the slide valve to be made of the high-temperature thermoplast. In the case of the stepping motor, this naturally applies only with the exception of the electromagnetic components. By making the slide valve entirely from the high-temperature thermoplast, a very simple manufacture is achieved. The service life is also increased. Even after a relatively long usage, which could normally cause wear, high-temperature thermoplast is still present as the material forming the sliding surface.

The invention also relates to a use of such a valve in a refrigeration system operated with refrigerants for control of the refrigerant flow. The use of the high-temperature thermoplast enables the valve on the one hand to be operated without external lubrication, so that no contaminants are able to enter the refrigerant. On the other hand, the valve can be made resistant also to the refrigerant.

The invention also relates to a use of such a valve for control of a water flow and/or water pressure. The use of the high-temperature thermoplast largely avoids cavitation and other wear phenomena.

The valve is preferably used in a hydraulic system operated with water as the hydraulic fluid for control of the flow and/or the pressure of the hydraulic fluid. As is known, water has virtually no lubricating properties. This has so far prevented the use of water as a hydraulic fluid, or at the least rendered its use very difficult. By constructing the valve with a high-temperature thermoplast on the sliding surfaces, this problem no longer arises. The high-temperature thermoplast is able to guarantee the sliding properties.

The valve can advantageously also be used to control one of the following media: steam, air, oil, $NH_3$, $CO_2$, saline solutions, corrosive fluids or gases.

BRIEF DESCRIPTION OF THE DRAWINGS

The invention is explained hereinafter with reference to preferred exemplary embodiments in conjunction with the drawing, in which FIG. 1 shows a first embodiment of a valve, partly in section, FIG. 2 shows a second embodiment of a valve, partly in section, FIG. 3 shows an embodiment of an actuating device for a valve, partly in section, FIG. 4 shows a third embodiment of a valve, partly in section, FIG. 5 shows a fourth embodiment of a valve, partly in section, FIG. 6 shows a fifth embodiment of a valve with a rotary slide valve in section (a) and in plan view (b), and FIG. 7 shows a sixth embodiment of a valve with rotary slide valve in section (a) and in plan view (b).

DESCRIPTION OF THE PREFERRED EMBODIMENTS

A valve 1 shown in FIG. 1 has in a housing 2 a valve seat 3, against which a closure member 4 bears. The closure member 4 is connected to a driver element 5. In this particular case, the closure member 4 and the driver element 5 are of one-piece construction. The driver element 5 can be actuated by an actuating device, not shown. This actuating device can be formed, for example, by a magnetic arrangement, not shown. A different external drive is also possible, for example, by means of a lever or other linkage.

The driver element 5 and the closure member 4 are together enclosed by a layer 6. This layer is arranged between the housing 2 and the driver element 5. It consists of a high-temperature thermoplast, in particular of polyarylether ketones or polyether etherketones. The high-temperature thermoplast can be reinforced with fibres; for example, glass fibres, carbon fibres or metal fibres can be added, which increase its mechanical strength, reduce the thermal expansion coefficient and improve the thermal conductivity. The thermal expansion coefficient of the layer 6, that is, of the high-temperature thermoplast, is approximately the same as the thermal expansion coefficient of the driver element 5, which in this particular embodiment is made of metal, and of the housing 2, which is likewise made of metal. The high-temperature thermoplast of the layer 6 slides with little friction on the inner wall 7 of the housing 2. Even if the layer 6 should lie with a greater pressure against the inner wall 7 because of a somewhat greater thermal expansion, the risk of the driver element 5 becoming jammed in the housing 2 is extremely small owing to the good sliding properties of the high-temperature thermoplast on the inner wall 7. The good sliding properties of the high-temperature thermoplast can be further improved by friction-reducing additives, for example, by carbon or polytetrafluoroethylene (PTFE).

The layer 6 also covers the closure member 4. By means of the layer 6 the seal between the closure member 4 and the valve seat 3 is improved.

The layer 6 completely encloses the driver element 5 and the closure member 4, and therefore protects these two parts against the fluid which flows from an inlet port 8 to an outlet port 9 or vice versa. The material of the driver element 5 and of the closure member 4 can therefore be selected independently of the fluid to be controlled. If the actuating device operates magnetically, the material of the driver element 5 can be selected, for example, exclusively from the point of view of a good magnetic conductivity. Thus, soft iron, for example, which would not be very resistant to corrosive fluids, can be used for the driver element.

The layer 6 can be very thin. Its thickness need be only a few tenths of a millimeter or even less than 1/10 mm. It must merely be sufficiently thick for contact between the inner wall 7 of the housing 2 and the driver element 5 to be avoided.

To manufacture the sheathed driver element 5, the layer 6 is preferably moulded around the driver element 5. For that purpose, an injection-moulding method is used. The layer 6 is therefore in the form of an injection-moulded part which is injected onto the driver element 5, or more accurately, onto the core 10 thereof. To achieve good adherence of the layer 6 to the core 10, the core 10 can have a rough surface. Such a rough surface will have been in many cases created already during manufacture of the core 10.

Such a valve 1 can be used, for example, to control the flow of refrigerant in a refrigeration system operated with a refrigerant. The layer 6 protects the core 10 from adverse effects of the refrigerant.

Another usage is the control of the flow of hydraulic fluid in a hydraulic system that is operated with water. As is known, water has virtually no lubricating properties, unlike the synthetic hydraulic oil s normally used. By providing the layer 6, which has a very strong friction-reducing action, the valve 1 can nevertheless be operated even though the hydraulic fluid has no lubricating action.

FIG. 2 shows a second construction of a valve 101, in which corresponding elements are provided with reference numbers increased by 100.

Unlike the construction shown in FIG. 1, the friction-reducing layer 106 now does not cover the entire driver element 105 o r its core 110. On the contrary, only two regions 106 are provided. In these regions 106, circumferential grooves 11 have been let into the surface of the core 110. High-temperature thermoplast is arranged in these circumferential grooves 11, in each case in the form of a ring 12. The grooves 11 prevent these rings 12 being displaced on the surface of the core 110 in the axial direction, that is, in the direction of movement of the driver element 105. The rings 12 protrude very slightly outwards beyond the core 110. Accordingly, only a very small air gap 13 is formed between the housing 102 and the driver element 105. The depth of the projection and the resulting width of the air gap 13 is likewise only 1/10 mm or less. The rings 12 of high-temperature thermoplast merely ensure that no direct contact is effected between the core 110 and the inner wall 107 of the housing 102. The rings 12 can also be manufactured by injection moulding.

FIG. 3 shows an actuating device 14 for a valve, such as that illustrated in FIG. 1 or 2. The actuating device 14 has coils 15, 16 which can be fed alternately with electric current. Depending on which coil 15, 16 is being supplied with current, the driver element 105 moves up or down in a housing 202. Of course, such a drive means could also be constructed with just one coil. To reduce friction between the inner wall 207 of the housing 202 and the driver element 205, rings 212 are again provided, each of which forms a friction-reducing layer between the core 210 of the driver element 205 and the inner wall 207 of the housing 202. In this case, the rings 212 are so thin, or protrude only so little beyond the external circumference of the core 210, that in practice their use causes no enlargement of the air gap. Enlargement of the air gap lies in a range far below 1/10 mm. The coils 15, 16 can therefore be dimensioned exactly as they were in the previously known actuating device. Any possible slight increase in the reluctance is more than compensated for by the improved sliding of the driver element 205 in the housing 202. By means of the sliding rings 212, a well-defined air gap can be determined. Contact between the inner wall 207 and the core 210 is avoided.

FIG. 4 shows a further construction of a valve 301, in which corresponding elements are provided with reference numbers increased by 300. Unlike the preceding embodiments, the driver element 305 here is guided through the housing. The layer 306, which is likewise arranged in the form of two rings 312 on the core 310 of the driver element 305, here serves simultaneously as a seal against fluid which is flowing between the two ports 308, 309. Here too, the rings 312 of high-temperature thermoplast are located in circumferential grooves 311 on the core of the driver element 305.

FIG. 5 shows a fourth construction, in which elements that correspond to those of FIG. 1 are provided with reference numbers increased by 400.

In this construction the driver element 405 is extended in the direction of movement so that it passes through the valve seat 403 and is guided by its extension 17 in the housing 402. The driver element 405 is thus guided on both sides of the valve seat 403. This allows a relatively accurate guidance, particularly in a situation in which the closure member 404 bears on the valve seat 403. The extension 17 is also provided with a friction-reducing layer 406.

A sealing face 18 is additionally provided on the closure member 404, and likewise consists of the high-temperature thermoplast. The high-temperature thermoplast therefore serves not only to reduce friction between the housing 402 and the driver element 405, but also to form a seal between the closure member 404 and the valve seat 403. In that case the advantages achieved are similar to those which were achieved where, in the embodiment according to FIG. 1, the driver element 5 and closure member 4 were completely sheathed.

FIG. 6 shows a fifth construction, in which elements that correspond to those of the preceding figures start with 500.

In this construction, the closure member 504 is in the form of a rotary slide valve and can be rotated in the housing 502 by means of the driver element 505. A spring 20 is provided, which holds the closure member 504 in engagement with a base plate 22 of the housing 502. The inlet port 508 and the outlet port 509 are provided in this base plate 22. The outlet port is in this case surrounded by the valve seat 503. If the closure member 504 is now rotated into the position illustrated in FIG. 6a, the outlet port 509 is closed. But fluid is able to flow from the inlet port 508 through a through-bore 21 in the closure member 504 to a second outlet port 19 or vice versa. The closure member 504 is formed totally from the high-temperature thermoplast. Both at the sliding surface with which it bears against the base plate 22 and at the sliding surface by which it is guided during the rotary movement, there is always a friction-reducing combination of materials present, that is, the high-temperature thermoplast of the closure member 504 and the metal of the housing 502.

FIG. 7 shows a sixth construction, in which elements which correspond to those of the preceding Figures start with 600. Here too, the closure member 604 is in the form of a rotary slide valve. It has a through-opening 621 which can also be seen in FIG. 7b. This through-opening coincides with a path formed between the inlet port 608 and the outlet port 609 and there unblocks a smaller or larger opening. The magnitude of the degree of opening is dependent on the rotated position of the closure member 604. Here too, a spring 620 which holds the closure member 604 in engagement with the valve seat 603 is again provided.

The closure member 604 is in the form of a rotor of a stepping motor. The stepping motor has a coil arrangement 23 which can be supplied in known manner with electric current. The closure member 604 has a permanent magnet arrangement 24. The function of a stepping motor is sufficiently well-known and needs no further explanation. Depending on the resolution of the stepping motor, the closure member 604 can be rotated into a corresponding number of rotated positions.

The magnetic arrangement 24 is likewise enclosed by the high temperature thermoplast, that is, there is always a layer 606 of the high-temperature thermoplast between the permanent magnet arrangement 24 and the housing 602. Not only does this produce favourable frictional values, the magnetic arrangement 24 is also reliably protected against attack by the fluids controlled by the valve 601.

I claim:

1. A valve having a closure member which co-operates with a valve seat located between an inlet port and an outlet port, the closure member being movable by an actuating device with a driver element, which driver element is guided in a housing, and in which a high temperature thermoplast is located between the housing and the driver element, the high temperature thermoplast being located in at least one circumferential groove on the driver element, covering partial areas on the driver element, and protruding slightly beyond the circumference of the driver element.

2. A valve according to claim 1, in which polyetherether ketone is used as the high-temperature thermoplast.

3. A valve according to claim 1, in which the high-temperature thermoplast is fibre-reinforced.

4. A valve according to claim 1, in which the high-temperature thermoplast has friction-reducing additives.

5. A valve according to claim 1, in which the high-temperature thermoplast comprises a friction-reducing layer on at least one of the driver element and the housing.

6. A valve according to claim 5, in which the layer has a thickness of approximately 1/10 mm.

7. A valve according to claim 1, in which the driver element has a core, the high-temperature thermoplast encapsulating at least a portion of the core.

8. A valve according to claim 7, in which the core has a rough surface.

9. A valve according to claim 1, in which the driver element and the closure member comprise one piece.

10. A valve according to claim 1, in which the driver element is surrounded completely by the high-temperature thermoplast.

11. A valve according to claim 1, in which the high-temperature thermoplast it also arranged on the closure member in a region co-operating with the valve seat.

12. A valve according to claim 1, in which the driver element is an armature of an electromagnetic valve.

13. A valve according to claim 12, in which the armature is formed from magnetically conductive soft iron which is covered by the high-temperature thermoplast in all areas that can come into contact with a fluid flowing through the valve.

14. A valve according to claim 1, including means for guiding the driver element in the direction of movement on both sides of the valve seat.

* * * * *